(No Model.)

C. P. MITCHELL.
TWINE PACKAGE.

No. 408,841. Patented Aug. 13, 1889.

Witnesses:
Robert D. Edes.
Frank E. Pray.

Inventor:
Charles P. Mitchell,
by Walter E. Lombard.
Attorney.

United States Patent Office.

CHARLES P. MITCHELL, OF BOSTON, MASSACHUSETTS.

TWINE PACKAGE.

SPECIFICATION forming part of Letters Patent No. 408,841, dated August 13, 1889.

Application filed June 1, 1888. Renewed February 15, 1889. Serial No. 300,079. (No model.)

*To all whom it may concern:*

Be it known that I, CHARLES P. MITCHELL, of Boston, in the county of Suffolk and State of Massachusetts, have invented certain new and useful Improvements in Twine Packages, of which the following, taken in connection with the accompanying drawings, is a specification.

My invention relates to twine packages, and particularly to packages of twine which are adapted for use for binding grain upon harvesting-machines, and it has for its object the production of a package which may be more conveniently handled, and which will contain comparatively no waste space as compared with the twine packages which are now in use. The twine-boxes upon modern harvesting-machines are large enough to contain two balls of twine, one upon the other; but this arrangement necessitates the tying of the end of one ball to the end of the other, which consumes valuable time, while a greater disadvantage is caused by the use of this system on account of the large amount of space in the box which is wasted, which might be occupied by twine. An attempt has already been made to obviate these difficulties and a package made consisting of a cylinder of twine which extended the entire length of the twine-box and practically filled the same; but when the core of the cylinder had been removed the outer layers were apt to fall in and allow the twine to become tangled and snarled, which was obviously a great objection to the use of that style of package.

My invention consists of a twine package so wound as to obviate all of these difficulties, as will be readily understood by reference to the description of the drawings and to the claims to be hereinafter given.

Figure 1:
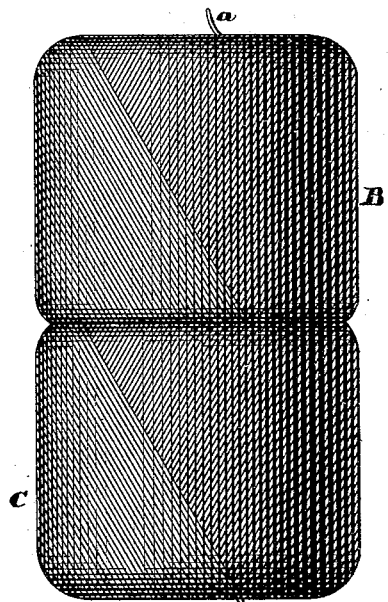
Figure 2:
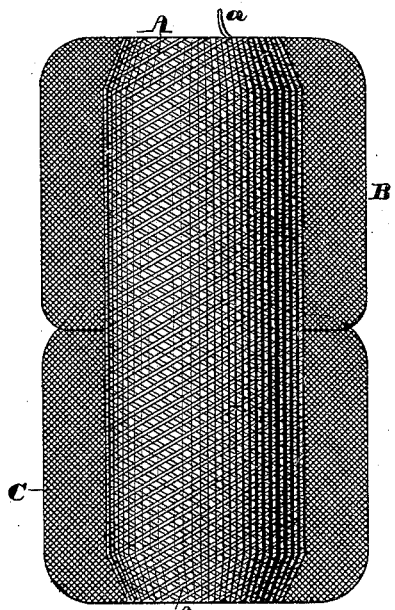
Figure 3:
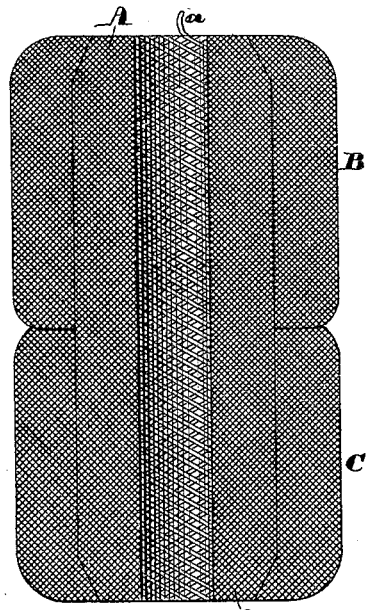
Figure 4:
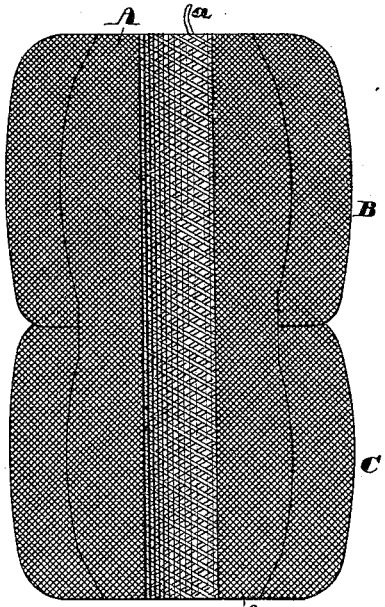

Of the drawings, Figure 1 represents an elevation of a twine package illustrating my invention. Fig. 2 represents a sectional elevation of the same, the inner core or cylinder being shown in elevation. Fig. 3 represents a sectional elevation through the entire package, and Fig. 4 represents a sectional elevation of a modified form of package.

In the drawings, A is a core of twine formed upon a spindle in the usual manner, the twine being wound somewhat open and in a spiral direction, as is shown in the drawings. The core A, by virtue of this method of winding, is greatly stiffened and cannot be easily broken.

When the core A has reached a sufficient diameter, a ball B is wound about one end of it, the twine from which said ball and said core is formed being continuous. The ball B having been formed upon one end of the core A, another ball C is wound about the other end thereof from the same twine that the core A and the ball B were formed from.

In the drawings the ends of the core A are shown tapered; but they may be of any other shape without altering the principles of my invention.

Instead of making the sides of the core straight they may be enlarged near the centers of the balls B and C, as shown in Fig. 4, so as to make it impossible to pull either of these balls from the end of the core, while at the same time the balls are considerably strengthened when the core A has been removed.

When in use upon a harvesting-machine, the package is placed within the twine-box, which it practically fills, and the end *a* of the core A is attached to the binder and the core is gradually removed, so that the hollow balls B and C alone remain in the box, after which the ball B is gradually removed, the twine being drawn from the inside in the usual manner, and, as the end of the twine which forms the ball B is connected to the inside end of the ball C, when said ball B has been removed the twine will then be drawn from the interior of the ball C until the last end *b* thereof has been used.

By winding the twine into this form of package the waste-space is reduced to a minimum, while, moreover, much labor in handling is also saved.

By virtue of this formation of a twine package there is no more opportunity for the twine to become tangled or snarled than would be the case were two balls of the usual construction used, while, as has already been stated, space is saved by the use of my improved package.

What I claim as new, and desire to secure by Letters Patent of the United States, is—

1. A twine package made up of two balls wound upon an inner core which extends from one to the other, the entire package being composed of a continuous twine.

2. A twine package made up of an inner core extending lengthwise of the package and having wound about said core two series of spiral courses or layers, each series extending a portion of the length of said core, the entire package being composed of a continuous twine.

In testimony whereof I have signed my name to this specification, in the presence of two subscribing witnesses, on this 29th day of May, A. D. 1888.

CHARLES P. MITCHELL.

Witnesses:
  WALTER E. LOMBARD,
  FRANK E. BRAY.